United States Patent
Hulvey

(10) Patent No.: US 7,321,755 B2
(45) Date of Patent: Jan. 22, 2008

(54) DUAL-MODE CLOCK FOR IMPROVED POWER MANAGEMENT IN A WIRELESS DEVICE

(75) Inventor: Robert W. Hulvey, Hermosa Beach, CA (US)

(73) Assignee: Broadcom Corporation, Irvine, CA (US)

( * ) Notice: Subject to any disclaimer, the term of this patent is extended or adjusted under 35 U.S.C. 154(b) by 239 days.

(21) Appl. No.: 10/630,285

(22) Filed: Jul. 30, 2003

(65) Prior Publication Data

US 2004/0023680 A1    Feb. 5, 2004

(51) Int. Cl.
    *H04B 1/16* (2006.01)
(52) U.S. Cl. .................. 455/343.1; 455/256; 455/574; 370/311
(58) Field of Classification Search ................ 455/258, 455/256, 259, 318, 343.1, 343.2, 343.3, 574; 370/311
    See application file for complete search history.

(56) References Cited

U.S. PATENT DOCUMENTS

| | | | |
|---|---|---|---|
| 2003/0060176 A1* | 3/2003 | Heinonen et al. ........... 455/255 |
| 2003/0144020 A1* | 7/2003 | Challa et al. ............... 455/522 |
| 2003/0173829 A1* | 9/2003 | Zeng ......................... 307/116 |
| 2003/0203722 A1* | 10/2003 | Karlquist et al. .......... 455/130 |
| 2004/0097265 A1* | 5/2004 | Cadieux et al. ............ 455/557 |
| 2005/0043068 A1* | 2/2005 | Shohara et al. ............ 455/574 |

* cited by examiner

*Primary Examiner*—Blane J. Jackson
(74) *Attorney, Agent, or Firm*—Garlick Harrison & Markison; Bruce E. Garlick

(57) ABSTRACT

A dual mode clock for providing first and second clock signals to a wireless interface unit. The first and second clock signals correspond to first and second operating states of the wireless interface unit. In the first operating state, the transceiver in the RF analog module is operational and the clock generator provides a first clock signal having low phase-noise characteristics necessary to maintain efficient operation of the transceiver. In a second operating state, the transceiver in the RF analog module is turned off. In this second operational state, the clock generator provides a second clock signal having a quality sufficient to maintain efficient operation of the digital baseband module in the wireless interface. By switching between low-power mode and normal mode, the system is operable to provide a high quality clock signal for use by the RF analog module when it is operational and to provide a lower power, lower quality clock signal which is sufficient for use by the baseband digital unit when the transceiver in the RF analog module is powered down.

8 Claims, 16 Drawing Sheets

DUAL-MODE CLOCK FOR IMPROVED POWER MANAGEMENT IN A WIRELESS DEVICE

BACKGROUND

1. Technical Field

The present invention relates generally to digital computers; and more particularly to wireless interface devices coupled to digital computers.

2. Related Art

Wireless communication technology has advanced rapidly over the past few years. One of the most promising areas for the use of wireless technology relates to communications between input/output devices and their "host" computers. For example, wireless keyboards and mice now couple via wireless connections to their host computers. These "wireless" input devices are highly desirable since they do not require any hard-wired connections with their host computers. However, the lack of a wired connection also requires that the wireless input devices contain their own power supply, i.e., that they be battery powered. In order to extend the life of their batteries, the wireless input devices often support power saving modes of operation. Some techniques for conserving power, however, can cause degradation in the performance of various system components in the wireless interface.

The various components in a wireless interface device have different operating requirements for the clock signals used for their operation. For example, the analog module typically requires a high quality clock signal with very low phase-noise. The digital module, however, can generally be operated efficiently with a clock signal having a higher phase-noise without serious degradation in performance. Generating a clock signal with the higher quality, low phase-noise characteristics required by an analog module requires more power than is required to generate a clock signal having the quality parameters required for a digital module. If the analog section is not operating, therefore, it is possible to conserve power by generating a clock signal having quality parameters needed only by the digital module. It would be desirable, therefore, to provide a wireless interface device having a power management system capable of conserving power by controlling the clock generator to provide different clock signals that are matched to the specific operational requirements of the system at any time.

SUMMARY OF THE INVENTION

The dual mode clock of the present invention overcomes shortcomings of the prior art by providing a method and apparatus for providing first and second clock signals to a wireless interface unit, with the first and second clock signals being generated at corresponding first and second power levels, depending on the operating mode of the wireless interface unit.

The wireless interface system of the present invention includes a wireless interface unit, a processing unit, an input/output unit, and a power management unit. The power management unit operably couples to the wireless interface unit, the processing unit, and the input/output unit. The power management unit operates to control the power consumption of the wireless interface device and the processing unit. The power management unit works in conjunction with a processing unit to determine whether the wireless interface unit is operating in a first power mode wherein a transceiver in a radio frequency module is operational or a second power mode wherein the transceiver is turned off.

A clock generator operates in conjunction with the power management unit, via a wireless interface unit voltage regulator, to provide first and second clock signals corresponding to first and second operating states of the wireless interface device. In the first operating state, the transceiver in the RF analog module is operational and the clock generator provides a first clock signal having low phase-noise characteristics necessary to maintain efficient operation of the transceiver. In a second operating state, the transceiver in the RF analog module is turned off. In this second operational state, the clock generator provides a second clock signal having a quality sufficient to maintain efficient operation of the digital baseband module in the wireless interface.

The baseband digital unit performs certain voltage regulator functionality to assist in power management functions. A transmitter operation detector and a voltage regulator control signal generator within the baseband core are operable to detect operation of the transceiver in the RF analog module and to generate a voltage regulator reference control signal for use by the processing unit to process data for the power management unit.

By switching between low-power mode and normal mode, the system is operable to provide a high quality clock signal for use by the RF analog module when it is operational and to provide a lower power, lower quality clock signal which is sufficient for use by the baseband digital unit when the transceiver in the RF analog module is powered down.

Moreover, other aspects of the present invention will become apparent with further reference to the drawings and specification, which follow.

DETAILED DESCRIPTION OF THE DRAWINGS

Figure 1A:
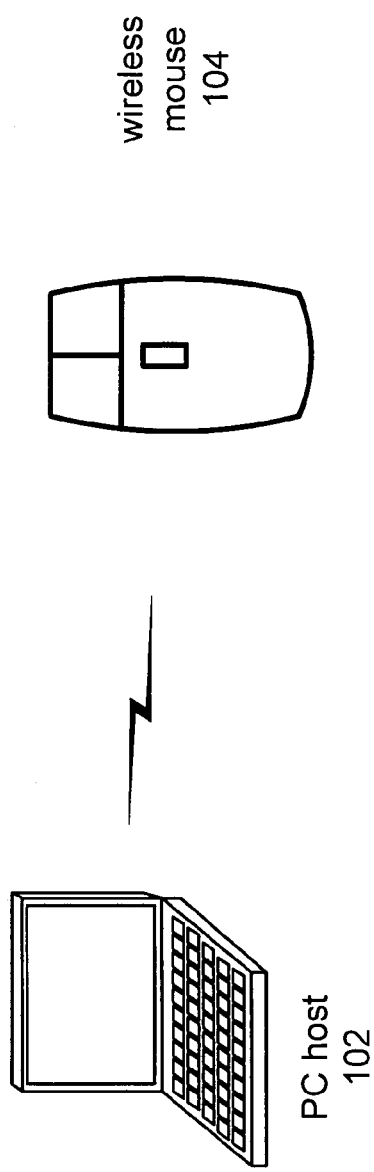
FIG. 1A is a system diagram illustrating a PC host and a wireless mouse that includes a wireless interface device constructed according to the present invention.

FIG. 1A is a system diagram illustrating a PC host 102 and a wireless mouse 104 that includes a wireless interface device constructed according to the present invention. As shown in FIG. 1A, the PC host 102 wirelessly couples to the wireless mouse 104. In the structure of FIG. 1A, the wireless mouse 104 includes a wireless interface device that operates to place the wireless mouse in any of a number of reduced power operating modes, including a power down mode in which battery life is substantially extended.

Figure 1B:
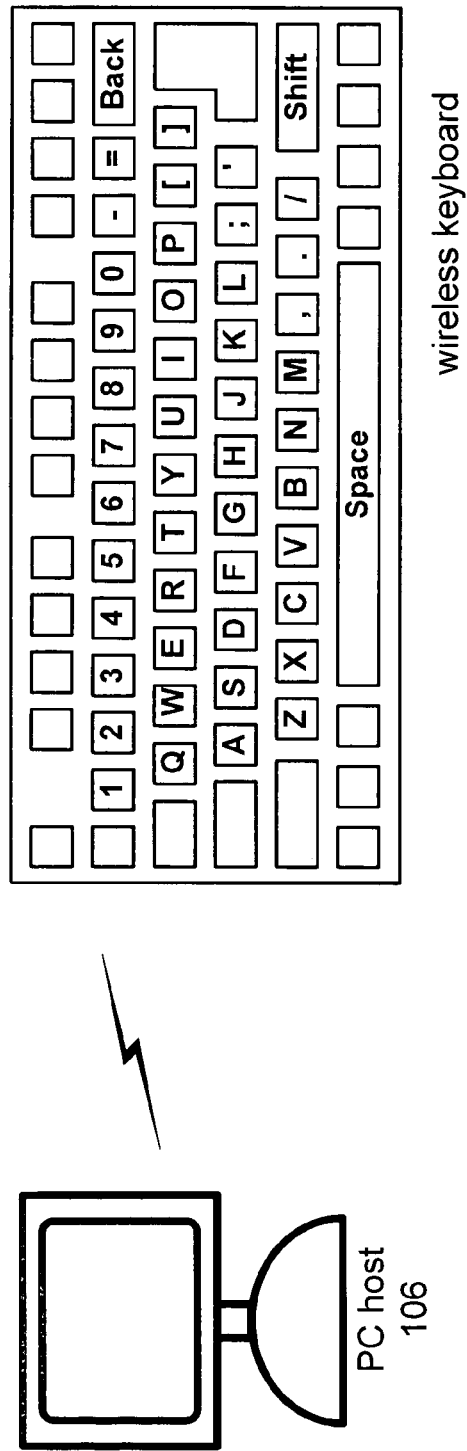
FIG. 1B is a system diagram illustrating a PC host and a wireless keyboard that includes a wireless interface device constructed according to the present invention.

FIG. 1B is a system diagram illustrating a PC host 106 and a wireless keyboard 108 that includes a wireless interface device constructed according to the present invention. The wireless keyboard 108 is battery powered and operates for extended periods of time on a single set of batteries because of the greatly reduced power consumption operations according to the present invention.

Figure 2:
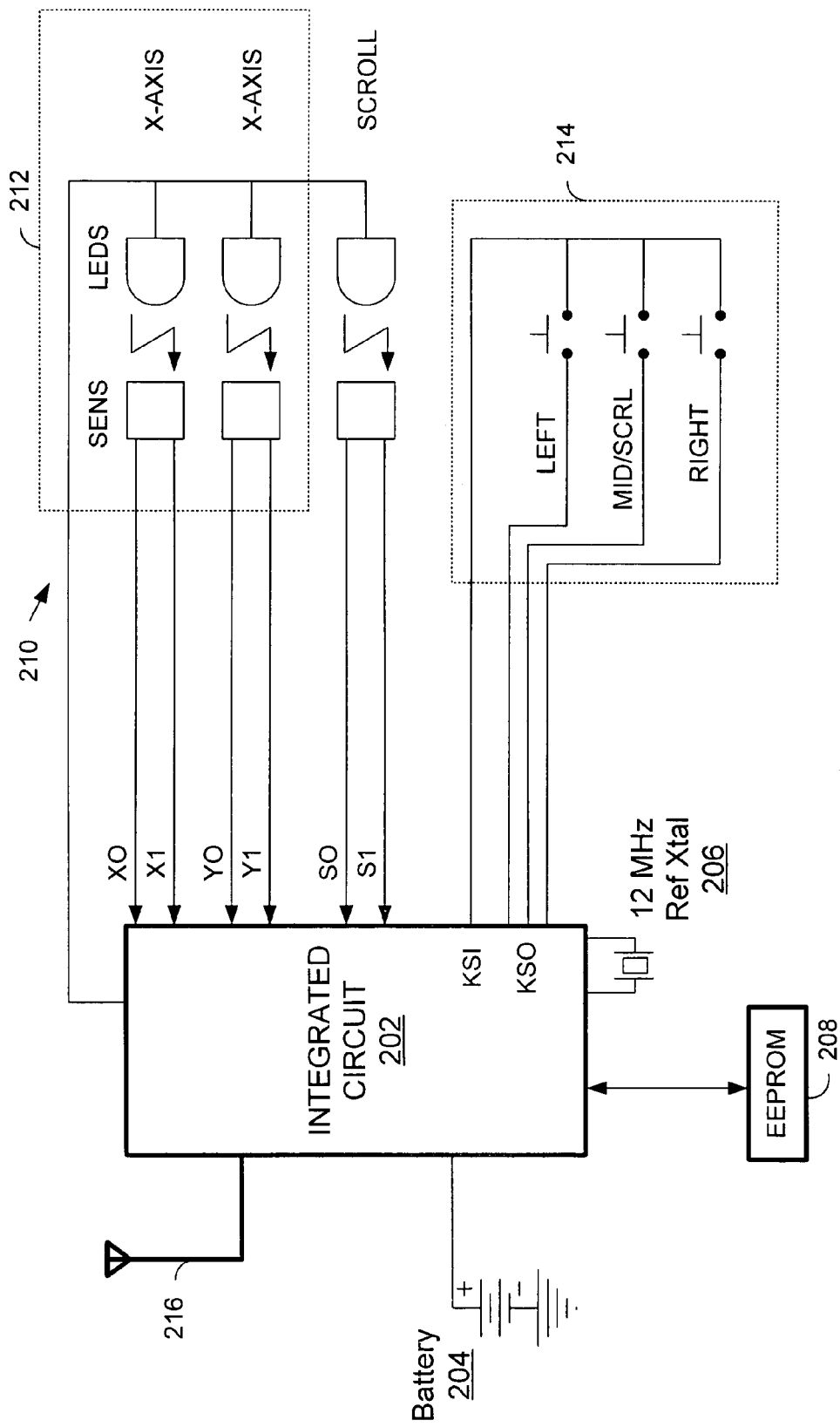
FIG. 2 is a schematic block diagram illustrating the structure of a wireless mouse that includes a wireless interface device constructed according to the present invention.

FIG. 2 is a schematic block diagram illustrating the structure of a wireless mouse that includes a wireless interface device constructed according to the present invention. An integrated circuit 202 constructed according to the present invention serves as the wireless interface device and couples to various mouse inputs 210. These mouse inputs 210 include x-axis and y-axis inputs as well as a scroll input. The x-axis and y-axis inputs are often referred to a "quadrature" inputs. The components that produce the quadrature inputs are generally referred to at numeral 212 and may be constructed from optical inputs instead of from conventional mechanical inputs. Referenced via numeral 214 are the button inputs that are typical with a computer mouse and include the left button input, the middle/scroll button input, and the right button input. As is shown, each of the signals produced by the mouse are received by integrated circuit 202.

Integrated circuit 202 also couples to battery 204, crystal 206 that produces a 12 MHz reference frequency, EEPROM 208, and antenna 216. In one embodiment of the present invention, battery 204 comprises a pair of either AA batteries or AAA batteries. Antenna 216 is an internal antenna in the described because of the size constraints of the mouse and because of the relatively short distance between the PC host and the wireless mouse.

Figure 3:
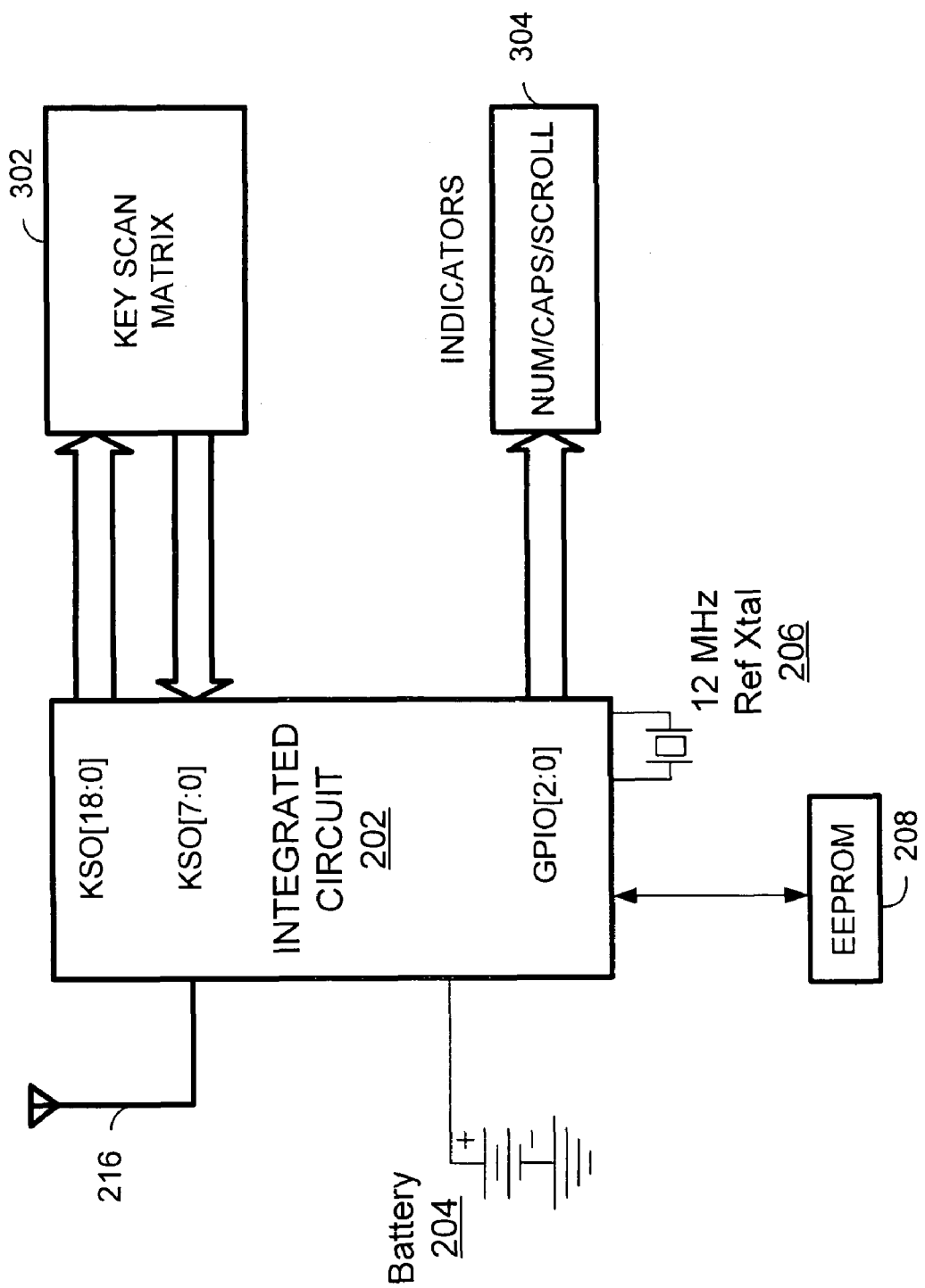
FIG. 3 is a schematic block diagram illustrating the structure of a wireless keyboard that includes a wireless interface device constructed according to the present invention.

FIG. 3 is a schematic block diagram illustrating the structure of a wireless keyboard that includes a wireless interface device (integrated circuit 202) constructed according to the present invention. As shown in FIG. 3, integrated circuit 202 services a key scan matrix 202 that provides inputs from the keyboard. Indicators 304 include number, capitals, and scroll lights that are lit on the keyboard. The integrated circuit 202 couples to a battery 204, a crystal 206, an EEPROM 208, and an antenna 216.

In another embodiment (not shown in either FIG. 2 or FIG. 3), the integrated circuit 202 services both mouse and keyboard input and may reside internal to either the mouse or the keyboard. As will be apparent to those skilled in the art, multiplexing or signal sharing may be required, because the input signals differ. However, different signal lines may be dedicated for keyboard and for mouse inputs such that no signal sharing is required. As is apparent, when the integrated circuit 202 alone services both mouse and keyboard, input wired connectivity between the keyboard and the mouse is required.

Figure 4:
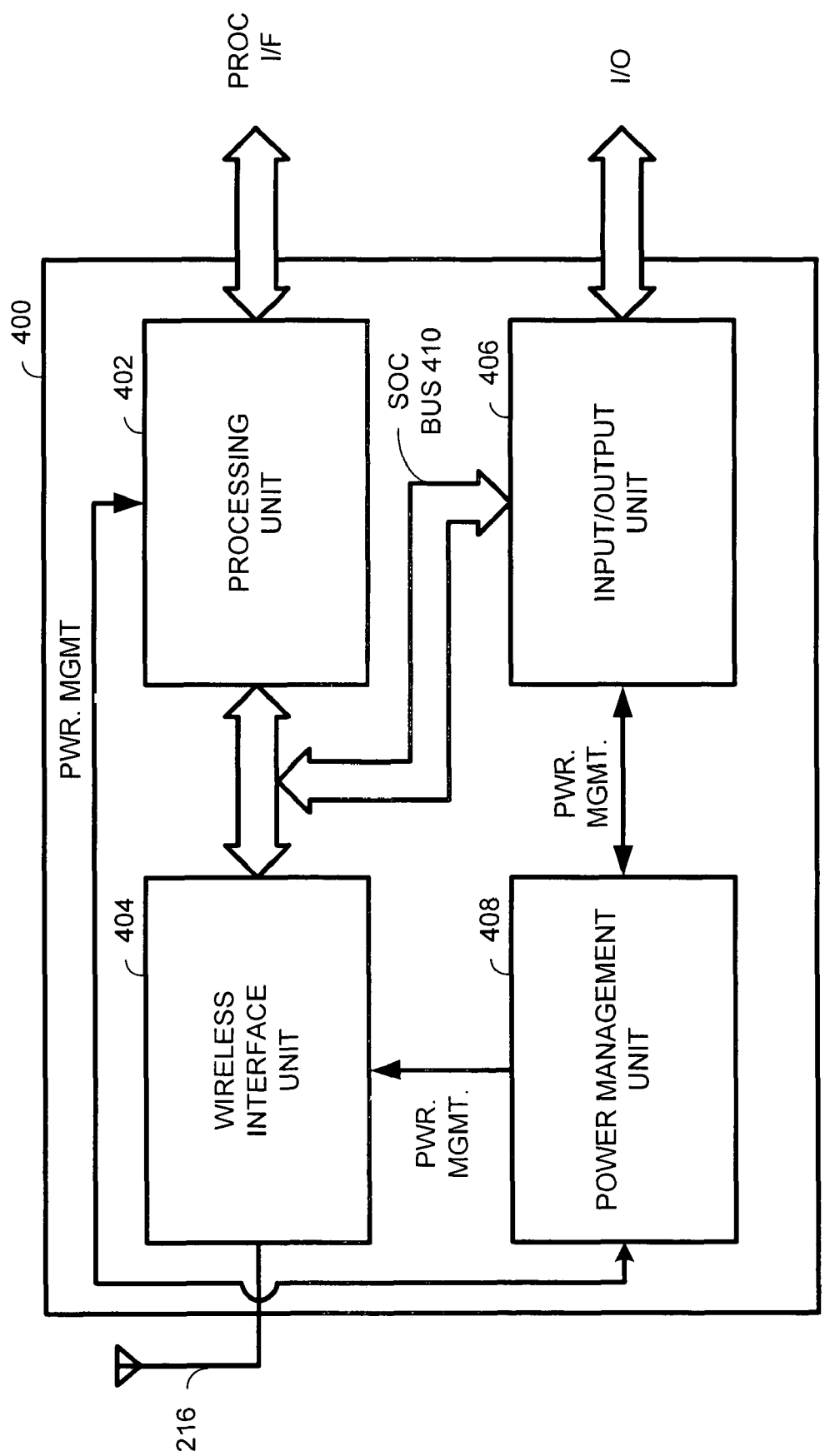
FIG. 4 is a block diagram illustrating a wireless interface device (integrated circuit) constructed according to the present invention.

FIG. 4 is a block diagram illustrating a wireless interface device (integrated circuit) constructed according to the present invention. As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 can be adapted to operate according to the Bluetooth specification and in particular to the Human Interface Device (HID) portion of the Bluetooth specification. It will be understood by those skilled in the art, however, that the present invention can be adapted to work in conjunction with other wireless interface standards.

Processing unit 402, wireless interface unit 404, and input/output unit 406 couple with one another via a system on chip (SOC) bus 410. Processing unit 402 includes a processing interface that may be used to couple the processing unit to one or more devices. Input/output unit 406 includes an input/output set of signal lines that couple the wireless interface device 400 to at least one user input device, such as a mouse or the keyboard incorporating the improved scan circuit described hereinbelow.

Figure 5A:
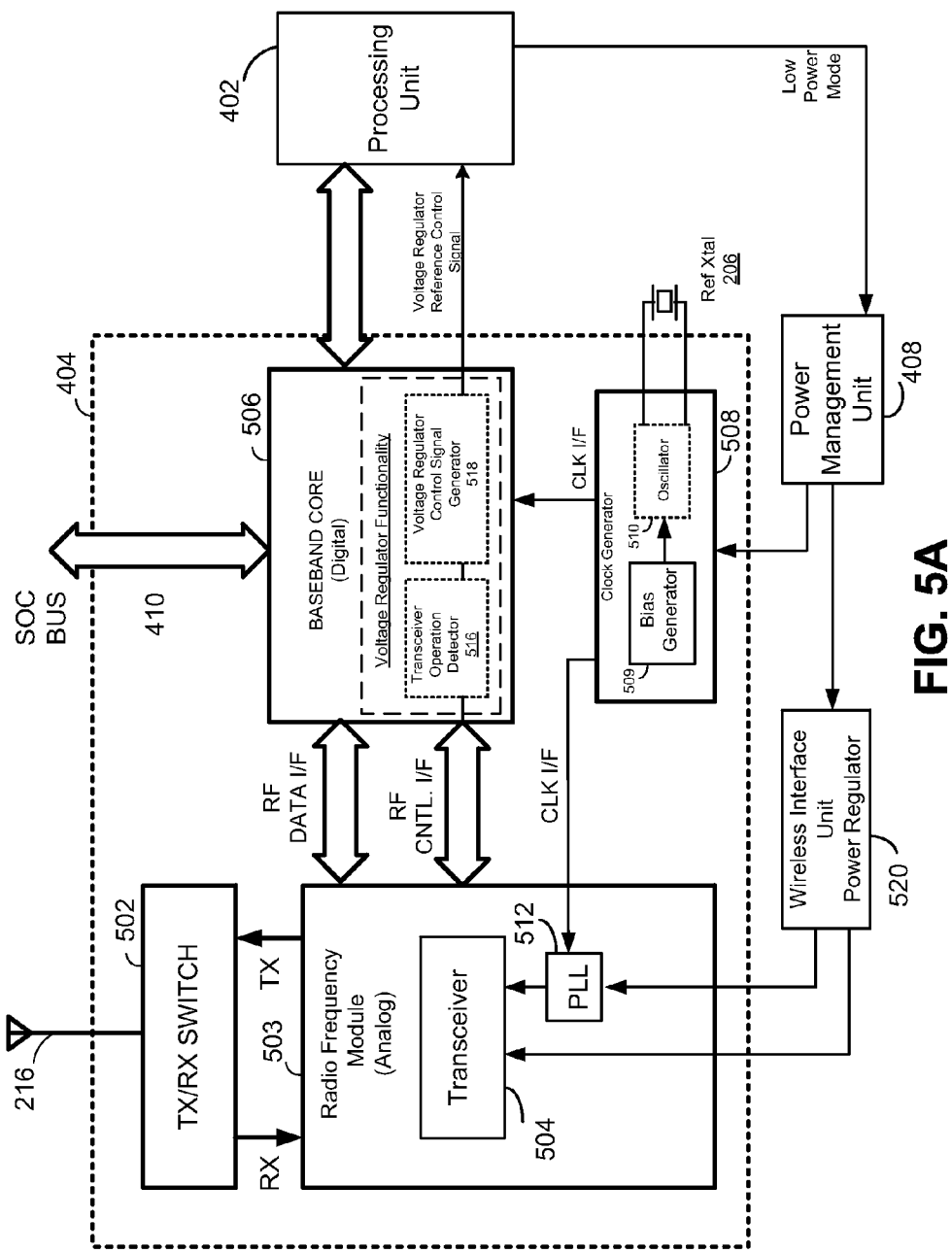
FIG. 5A is a block diagram illustrating a first embodiment of a wireless interface unit employing the dual mode clock system of the present invention.

FIG. 5A is a block diagram illustrating a wireless interface unit of the wireless interface device of FIG. 4. The wireless interface unit 404 includes a transmit/receive switch 502, a radio frequency module 503 that comprises a 2.4 GHz transceiver 504, a baseband core 506 which may be compatible with the Bluetooth standard and a clock generator 508. Each of these components is generally known in the field and will be described in minimal detail herein.

The transmit/receive switch 502 couples to antenna 216 and switches between transmit and receive operations. The 2.4 GHz transceiver 504 performs all RF front-end operations and operates within a frequency band and on particular channels as are specified by the Bluetooth operating standard. The 2.4 GHz transceiver 504 couples to baseband core 506. Such coupling is performed via an RF control interface and an RF data interface. The RF control interface performs the necessary control operations to guaranty that the 2.4 GHz transceiver 504 and the baseband core 506 will operate consistently within desired operating specifications. The RF data interface transfers both Rx and Tx data between the 2.4 GHz transceiver 504 and the baseband core 506. Clock generator 508 comprises a bias generator 509 and an oscillator 510 that couples to the external crystal 206 operating at 12 MHz, and to the frequency synthesizer 512. The clock generator 508 is controlled to provide an RF frequency for the 2.4 GHz transceiver 504 which is used to mix with the baseband signal received from the baseband core during a transmit operation and to mix with the received RF signal during a receive operation. The clock generator 508 operates in conjunction with the power management unit 408, via the wireless interface unit voltage regulator 520, to provide different clock signals corresponding to different power states as discussed hereinbelow.

The baseband digital unit performs certain voltage regulator functionality to assist in power management functions. A transceiver operation detector 516 and a voltage regulator control signal generator 518 within the baseband core 506 cooperate to detect operation of the transceiver in the RF analog module 503 and to generate a voltage regulator reference control signal for use by the processing unit 402 to process data for the power management unit 408.

The frequency synthesizer 512 produces a high quality, low phase-noise clock signal for operation of the analog section of the RF analog module 503. As discussed herein, a power management unit 408 is operable to provide power at varying power levels depending on the operating mode of the system. A "low-power mode" control signal is used to cause the power management unit to switch between dual operating modes, thereby controlling power to the RF module 503 and the clock generator 508, depending on the specific operating mode.

Figure 5B:
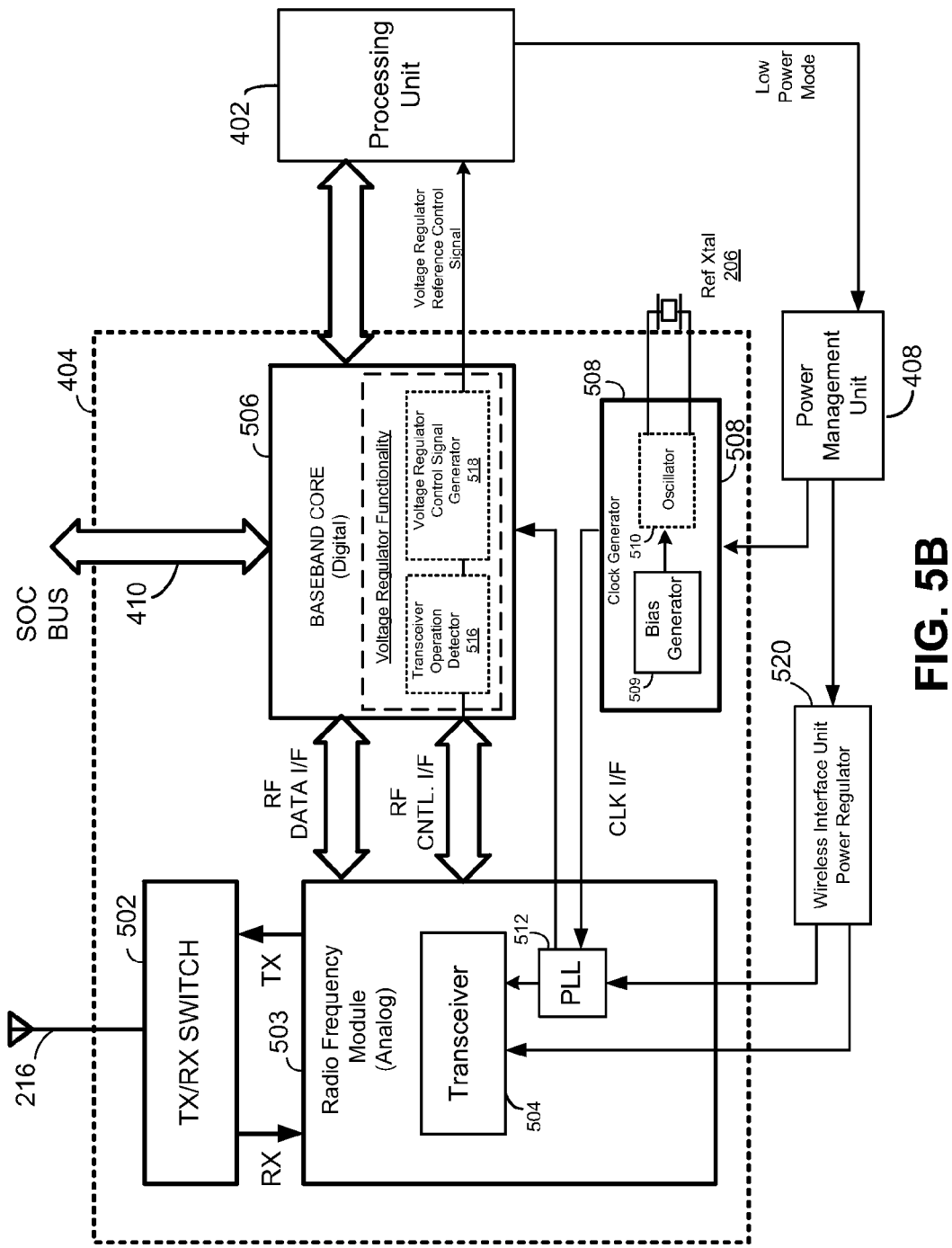
FIG. 5B is a block diagram illustrating a second embodiment of a wireless interface unit employing the dual mode clock system of the present invention.
Figure 5C:
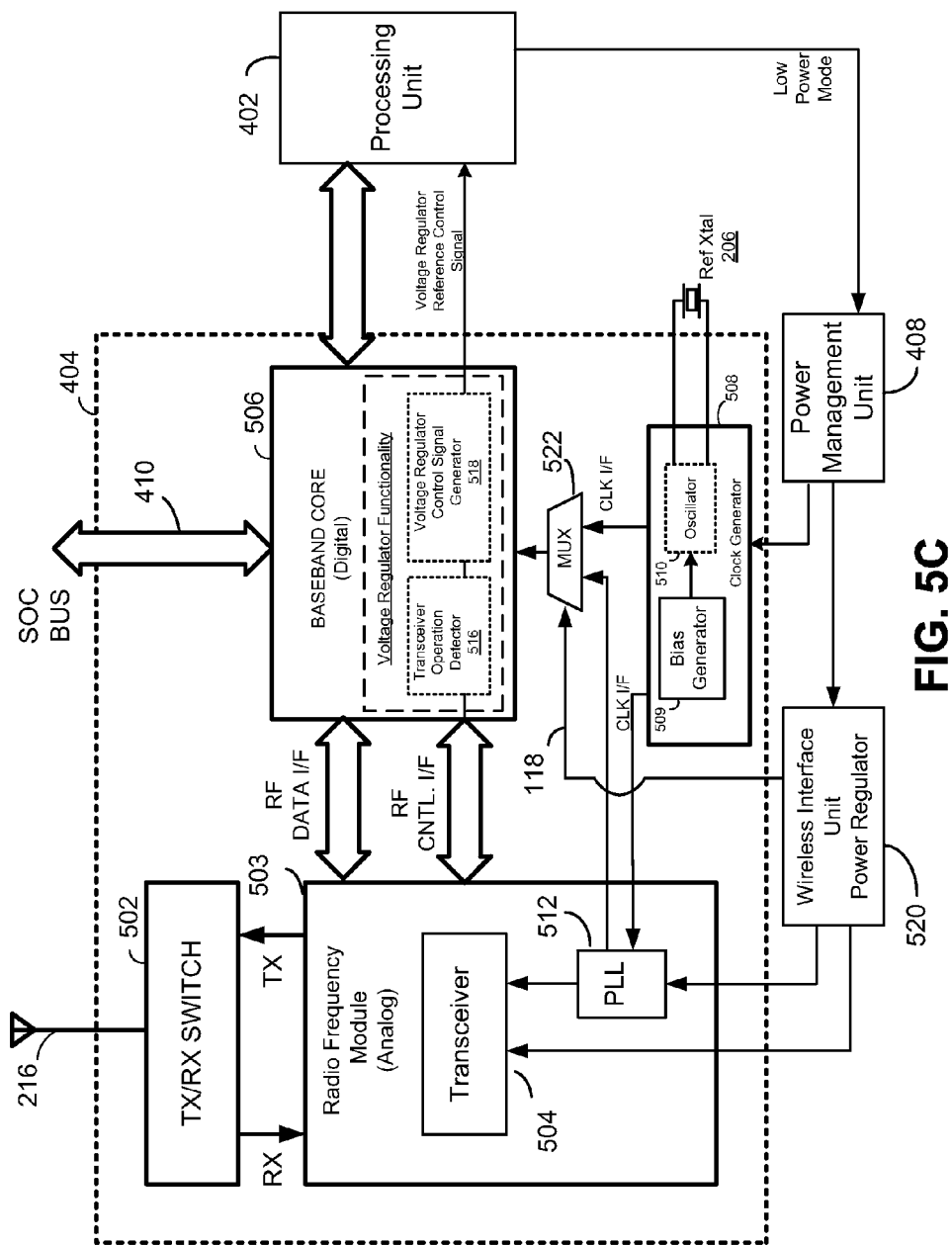
FIG. 5C is a block diagram illustrating a third embodiment of a wireless interface unit employing the dual mode clock system of the present invention.

When the low-power mode (LPM) signal shown in FIGS. 5A-C is "low," the system operates in "normal" mode. When the LPM signals goes "high," the system enters a low-power mode. In the low-power down mode, the RF analog module 503 is turned off and the frequency synthesizer 512 is also turned off. The oscillator 510 is switched to a low-power mode, which generates a clock signal of sufficient quality to control the baseband digital core 506. When the LPM signal goes low, the system returns to normal mode whereby the bias generator 509 provides a higher power bias signal to the clock generator 508, thereby allowing the clock generator to generate a higher quality clock signal for use by the frequency synthesizer 512.

By switching between low-power mode and normal mode, the system is operable to provide a high quality clock signal for use by the RF analog module 503 when it is operational and to provide a lower power, lower quality clock signal which is sufficient for use by the baseband digital unit 506 when the transceiver 504 and frequency synthesizer 512 in the RF analog module 503 are powered down.

FIG. 5B is an illustration of an alternate embodiment of the dual mode clock of the present invention. In this embodiment, the clock signal output of the clock generator 508 is provided to the frequency synthesizer 512. However, no clock signal is provided directly from the clock generator to the baseband digital core 506. In this embodiment, the frequency synthesizer in the RF analog module 503 generates a low phase-noise clock for the transceiver 504. In addition, the output of the frequency synthesizer 512 is also used to generate a clock signal for the baseband digital core 506. Again, when the LPM signal is low, the system operates in "normal" mode. When the LPM signal goes high, the system enters a low-power mode. In the power down mode, the transceiver 504 in the RF analog module 503 is turned off. The frequency synthesizer 512, however, continues to run, thereby providing a clock signal to the baseband digital core 506. When operating in the power down mode, the bias generator 509 provides a lower power bias signal to the oscillator 510 in the clock generator 508.

Operation of the embodiments of FIGS. 5A-C will be discussed below in connection with the flowcharts of FIGS. 11-13.

FIG. 5C is an illustration of another alternate embodiment of the dual mode clock of the present invention. In this embodiment, the oscillator 510 provides a clock signal to the frequency synthesizer 512. The frequency synthesizer 512 provides a high quality, low phase-noise clock signal for the RF analog module 503 and also provides a clock signal for the baseband digital core 506. The clock signal generated by the frequency synthesizer 512 for use by the baseband digital core 506, however, is provided as an input to a multiplexer 522, rather than being provided directly to the baseband core 506. When the LPM signal is low, the system operates in normal mode with both the transceiver 504 in the RF analog module 503 and the baseband digital core 506 receiving clock signals from the frequency synthesizer 512. When the LPM signal goes high, however, the system enters a low-power mode wherein the transceiver 504 in the RF analog section 503 is turned off and the bias generator 509 sends a lower power bias signal to oscillator 510, switching 510 to low-power mode. In the low-power down, the clock source for the baseband digital core 506 is switched from the frequency synthesizer 512 to the oscillator 510. A power down mode transition signal 118 from the power management unit 408 is used to control the multiplexer 522 to switch between the clock signal generated by the frequency synthesizer 512 and the oscillator 510. At the same time, the processing unit 402 controls bias generator 509 to adjust the power consumption of clock generator 508.

Figure 6:
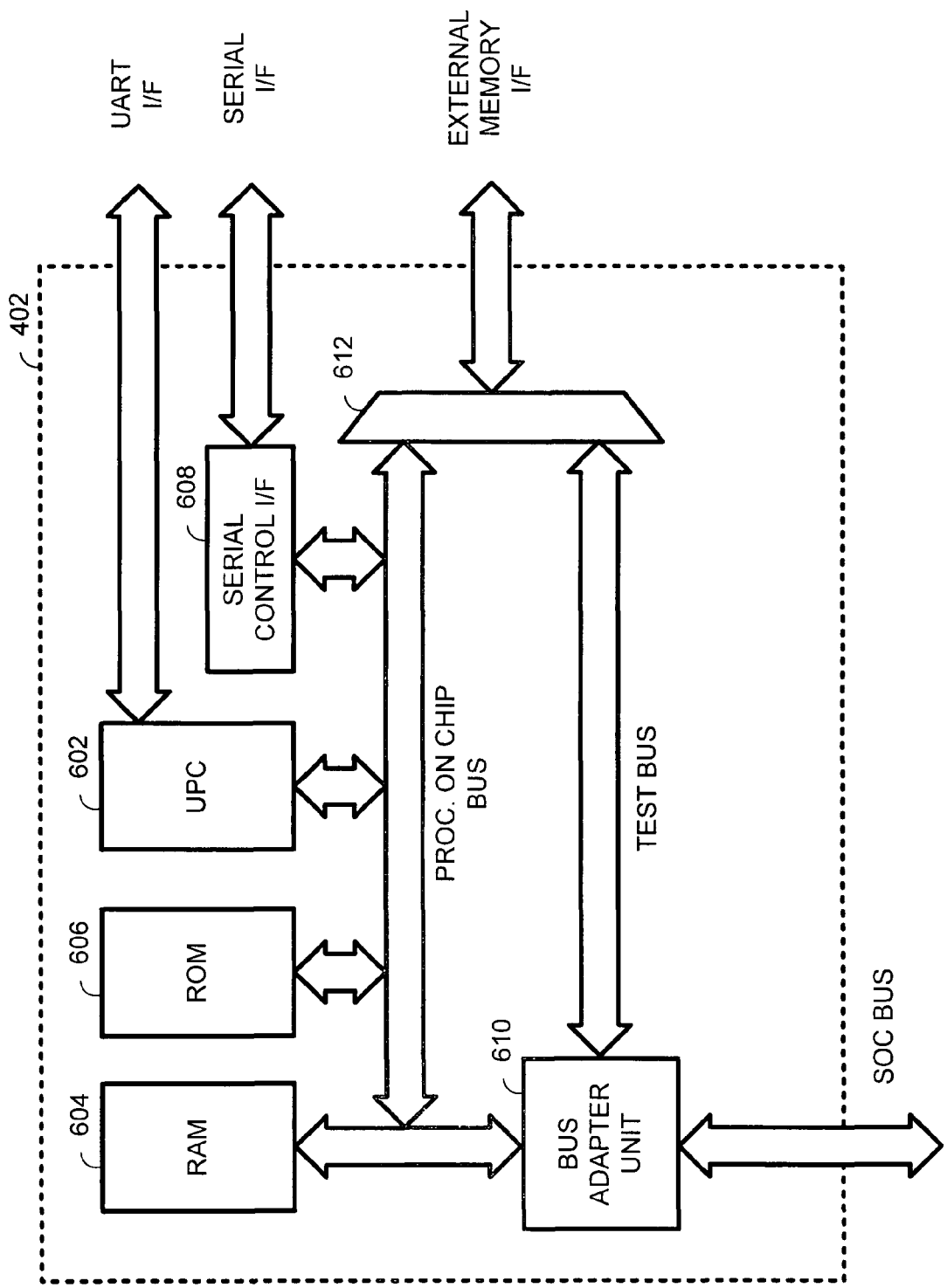
FIG. 6 is a block diagram illustrating a processing unit of the wireless interface device of FIG. 4.

FIG. 6 is a block diagram illustrating a processing unit 402 of the wireless interface device of FIG. 4. The processing unit 402 includes a microprocessor core 602, read only memory 606, random access memory 604, serial control interface 608, bus adapter unit 610, and multiplexer 612. The microprocessor core 602, ROM 606, RAM 604, serial control interface 608, bus adapter unit 610, and multiplexer 612 couple via a processor on a chip bus. Multiplexer 612 multiplexes an external memory interface between the processor on a chip bus and a test bus. The bus adapter unit 610 interfaces the processor on a chip bus with the SOC. The microprocessor core 602 includes a universal asynchronous receiver transmitter interface that allows direct access to the microprocessor core. Further, the serial control interface 608 provides a serial interface path to the processor on a chip bus.

Figure 7:
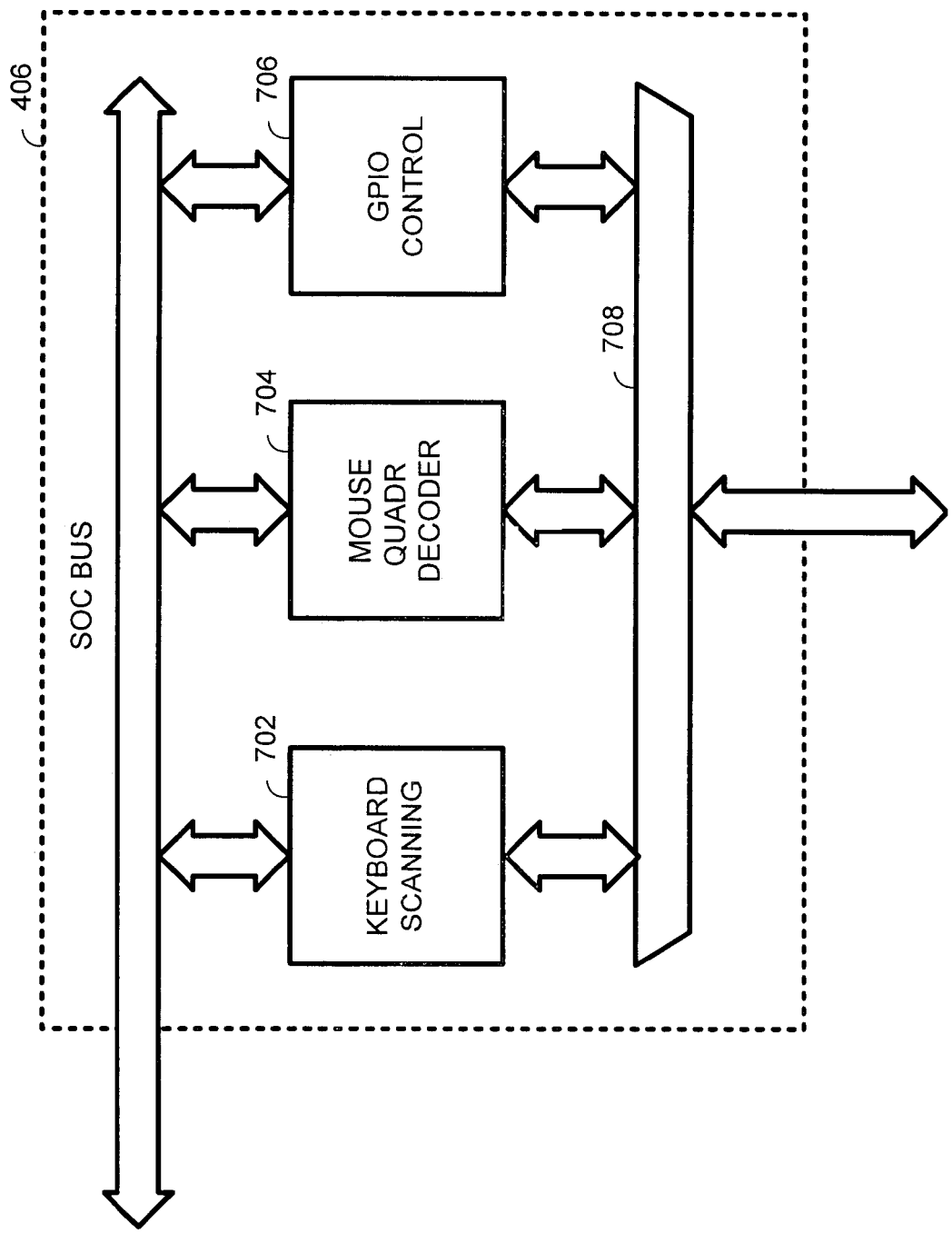
FIG. 7 is a block diagram illustrating an input/output unit of the wireless interface device of FIG. 4.

FIG. 7 is a block diagram illustrating an input/output unit 406 of the wireless interface device of FIG. 4. The input/output unit 406 includes a keyboard scanning block 702, a mouse quadrature decoder block 704, and a GPIO control block 706. Each of the keyboard scanning block 702, the mouse quadrature decoder block 704 and the GPIO control block 706 couple to the SOC bus. Further, each of the keyboard scanning block 702, the mouse quadrature decoder block 704, and the GPIO control block 706 couple to I/O via multiplexer 708. This I/O couples to the at least one user input device.

In another embodiment of the input/output unit 406, each of the keyboard scanning block 702, the mouse quadrature decoder block 704, and the GPIO control block 706 couples directly to external pins that couple to the at least one user input device.

Figure 8:
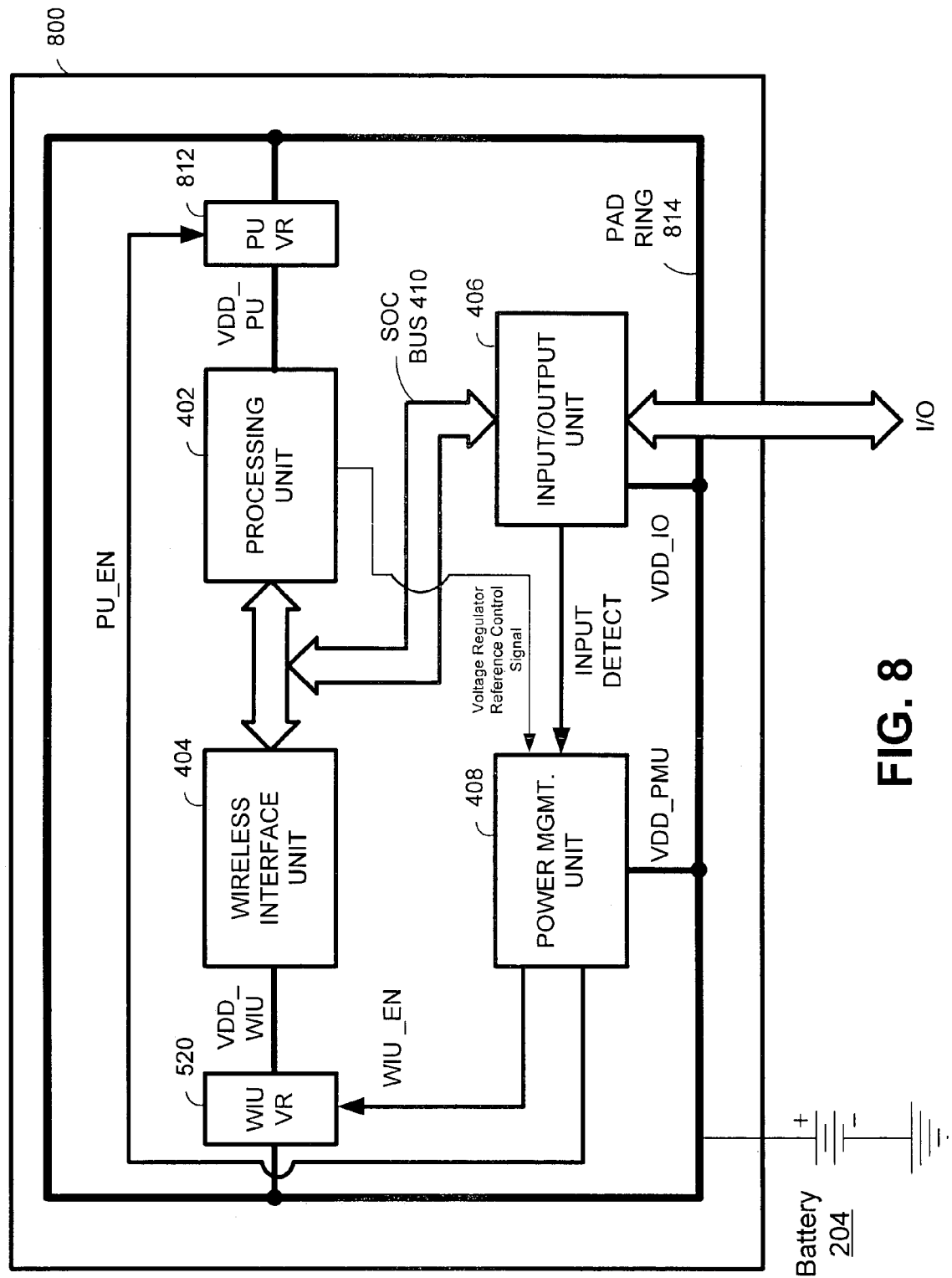
FIG. 8 is a block diagram generally showing the structure of an integrated circuit constructed according to the present invention with particular detail in the coupling of battery power to the units of the device.

FIG. 8 is a block diagram generally showing the structure of an integrated circuit constructed according to the present invention with particular detail in the coupling of battery power to the units of the device. Integrated circuit 800 of FIG. 8 includes a wireless interface unit 404, processing unit 402, input/output unit 406, and power management unit 408. The processing unit 402, wireless interface unit 404, and input/output unit 406 couple via a SOC bus 410. Further, as was previously described, input/output unit 406 couples to at least one user input device via I/O connection.

With the integrated circuit 800 of FIG. 8, a pad ring 814 surrounds a substantial portion of the components of the integrated circuit. The pad ring 814 couples directly to battery 204, which powers the pad ring. Further, input/output unit 406 and power management unit 408 couple directly to pad ring 814 to receive their power and voltage. However, processing unit 402 couples to pad ring 814 via processing unit voltage regulation circuitry 812. Further, the wireless interface unit 404 couples to pad ring 814 via wireless interface unit voltage regulation circuitry 520. The processing unit voltage regulation circuitry 812 is controlled by the power management unit 408 via control signal PU_EN. Further, the wireless interface unit voltage regulation circuitry 520 is controlled by the power management unit 408 using control signal WIU_EN.

The integrated circuit operates in four different power-conserving modes: (1) busy mode; (2) idle mode; (3) suspend mode; and (4) power down mode. Busy mode, idle mode, and suspend mode are described in the Bluetooth specification. However, power down mode is unique to the present invention.

In busy mode, the Master (host computer) is actively polling the HID (wireless mouse, wireless keyboard, etc.) for data at a polling rate near 100 polls/second, or about once every 16 slot times. Continued user activity (keypad strokes, mouse motion, button presses, etc.) keeps the HID in busy mode. If there has been no activity for a few seconds (determined by particular settings), operation transitions to idle mode.

In idle mode, the HID requests the master (serviced host) to enter SNIFF mode with a SNIFF interval that is chosen based on desired latency and average power consumption. In one operation, the SNIFF interval is 50 ms, or about every 80 slot times. Although the HID can I/O Active immediately after an event, it may have to wait up to 100 mS to transmit its data to the host, and therefore must have enough buffer space to store 100 mS of events. If an event occurs, the HID requests the master to leave SNIFF mode. If there is no further activity for a longer period, the HID transitions from idle mode to suspend mode. Then, the HID is parked.

In suspend mode, a longer beacon interval can be used for a lower power state. When in suspend mode, any user input detected will result in the HID requesting to be unparked and transitioned back to the busy mode. When the HID is parked, it consumes less power than when the host is in SNIFF mode since the HID does not have to transmit. In suspend mode, the HID just listens to the beacons to remain synchronized to the master's frequency hopping clock. As long as the master continues transmitting (meaning the host is not turned off) the HID will remain in suspend mode. If link loss occurs due to the host being turned off without warning, or the host moving out of range, the Lost Link state will be entered.

According to the present invention, the power down mode is also supported. In the power down mode, the power management unit 408 operates the processing unit voltage regulation circuitry 812 and the wireless interface unit voltage regulation circuitry 520 to power down the processing unit 402 and wireless interface unit 404, respectively. These states of operation will be described further with reference to FIGS. 9 and 10.

Figure 9:
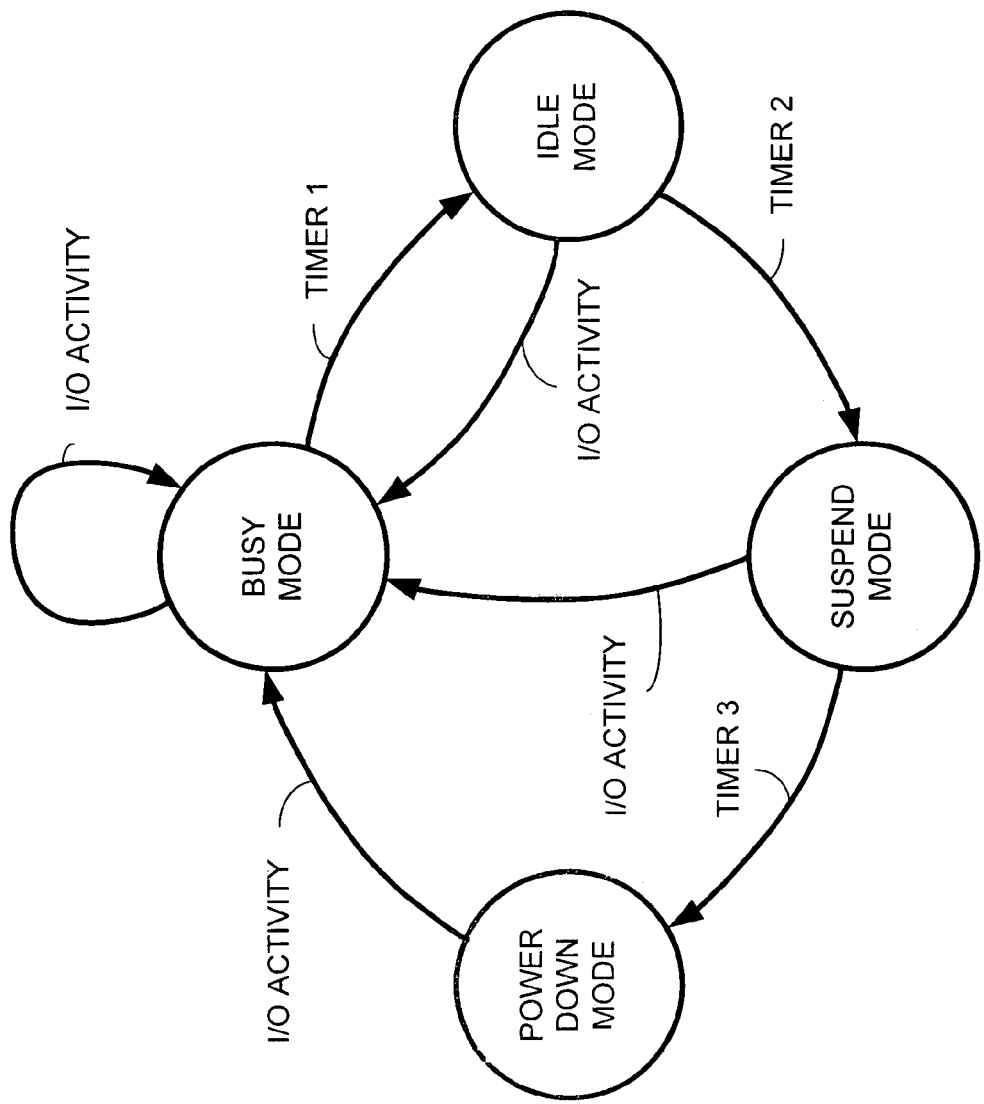
FIG. 9 is a logic diagram illustrating operation according to the present invention.

FIG. 9 is a logic diagram illustrating operation according to the present invention. As illustrated in FIG. 9, a wireless interface device operating according to the present invention operates in four separate power-conserving modes. These power conservation modes include the busy mode, the idle mode, the suspend mode and the power down mode. The state diagram of FIG. 9 shows how each of these modes is reached during normal operation.

When the wireless interface device is initially powered up, it enters the busy mode of operation. In the busy mode of operation, all features and wireless operations of the wireless interface device are enabled. As long as I/O activity continues, the wireless interface device remains in the busy mode. However, after expiration of a first timer with no I/O activity, the operation moves from the busy mode to the idle mode. Operation will remain in idle mode until the expiration of a second timer or until I/O activity occurs.

If while in the idle mode I/O activity occurs, operation returns to the busy mode. If in the idle mode, if timer 2 expires with no additional I/O activity, suspend mode is entered. While in suspend mode, if I/O activity occurs, operation returns to busy mode. However, if in suspend mode, no additional I/O activity occurs until the expiration of a third timer, power down mode is entered. While in the power down mode, operation will remain in the power down mode until I/O activity occurs. When I/O activity occurs, operation of the wireless interface device will move from the power down mode to the busy mode.

Figure 10:
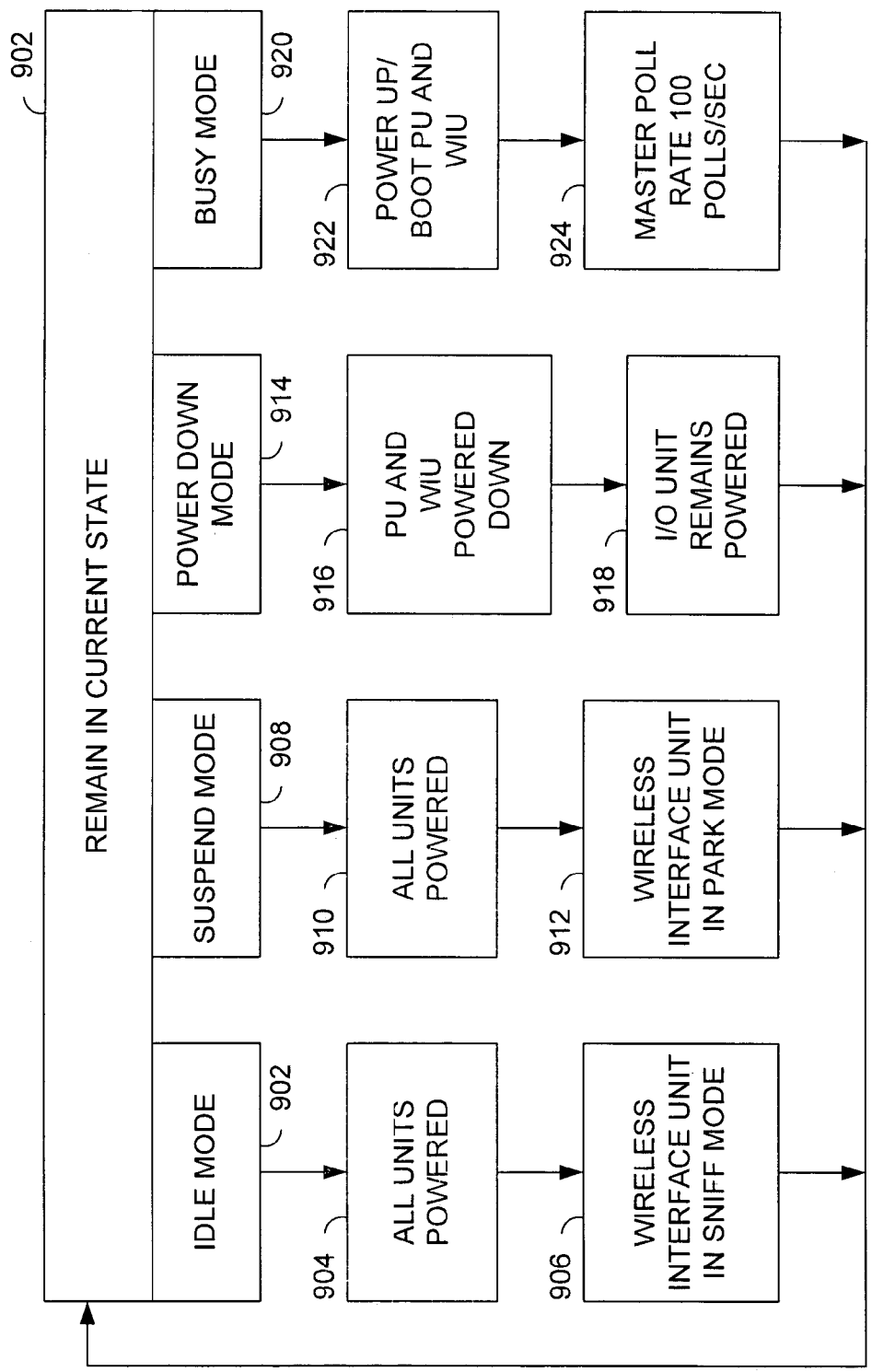
FIG. 10 is a logic diagram illustrating operation according to the present invention in controlling the power consumption of a serviced device.

FIG. 10 is a logic diagram illustrating operation according to the present invention in controlling the power consumption of a serviced device. As shown in FIG. 10, once operation in a particular power conservation state, e.g., busy mode, idle mode, suspend mode, and power down mode has commenced, operation will remain in that state until expiration of respective timer or I/O activity occurs (step 902).

When power conservation operation occurs to move from the busy mode to the idle mode (step 902), all portions of the wireless interface device remain powered (step 904). However, in the idle mode, the wireless interface unit enters a sniff mode in which some of its operations are reduced. Such operations were previously described with reference to FIG. 9. Further, additional information regarding this mode is available in the Bluetooth HID standard.

When the operation of the wireless interface device transitions from the idle mode to the suspend mode (step 908), all portions of the wireless interface device remain powered (step 910). However, the wireless interface unit of the wireless interface device enters the park mode, which consumes even less power than does the wireless interface unit when in the sniff mode.

When in the suspend mode if an additional timer or inactivity period expires, the wireless interface device will transition to the power down mode (step 914). In the power down mode, the processing unit and wireless interface unit will be powered down (step 916). This power down operation will be performed in one embodiment by simply disconnecting a voltage source from the processing unit in the wireless interface unit. One such technique for doing this is described with reference to FIG. 8. In the power down mode, the I/O unit will continue to be powered to allow it to sense the state of the user input device lines.

Finally, from any of the reduced power operating states, when I/O activity is sensed by the I/O block, the wireless input device will transition back to the busy mode (step 920). When such operation occurs, if the components have been powered down, they will be a powered up and will go through their boot operations (step 922). Then, in the busy mode, the wireless interface unit will operate in its normal state in which the master wireless device, i.e., wirelessly enabled host will poll the wireless interface device at 100 times per second. From each of steps 906, 912, 918, and 924, operation returns to step 902 wherein the current power conservation state will be kept until another event occurs.

Figure 11:
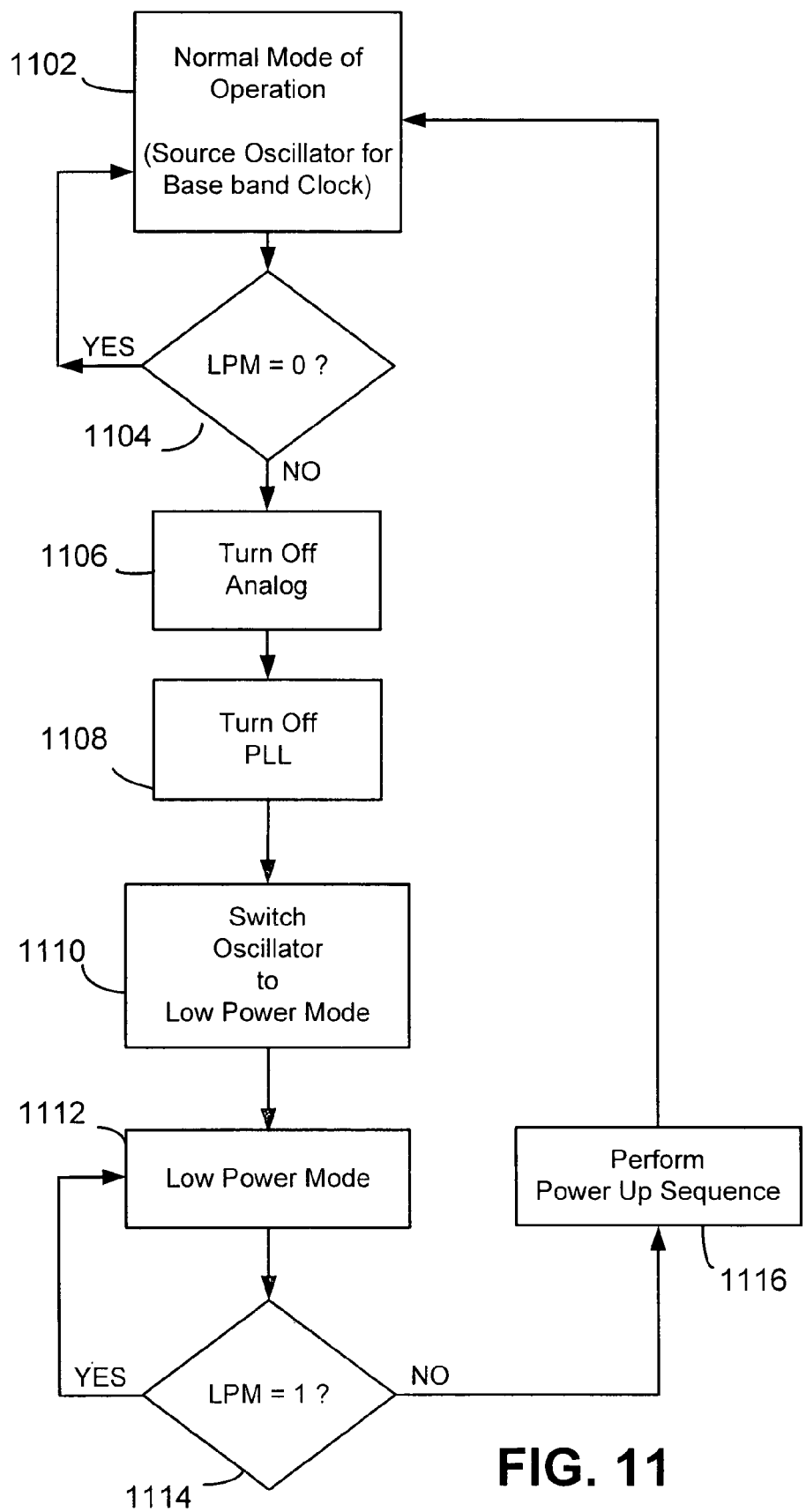
FIG. 11 is a flow chart illustrating the processing steps for operating the embodiment of wireless interface unit shown in FIG. 5A using the dual mode clock of the present invention.

Operation of the dual mode clock embodiment illustrated in FIG. 5A can be understood by referring to the processing steps shown in the flowchart of FIG. 11. In step 1102, the system enters the normal mode of operation wherein the oscillator 510 provides a clock signal directly to the baseband digital core 506 and to the frequency synthesizer 512 in the RF analog module 503 as discussed hereinabove. In step 1104, the status of the low-power mode signal, LPM, is inspected by the power management unit 408. If the LPM signal is low, processing returns to step 1102 wherein the normal mode of operation is continued. If, however, the test in step 1104 indicates that the LPM signal is high, processing proceeds to step 1106 where the transceiver 504 in the RF analog module 103 is turned off and the frequency synthesizer 512 is turned off in step 1108. In step 1110 the oscillator is switched to low-power mode and processing proceeds to step 1112 where the system is operating in low-power mode. In step 1114, a test is conducted to determine whether the state of the LPM signal has changed. If the test conducted in step 1114 indicates that the LPM signal remains high, processing returns to step 1112 and the system continues to operate in the low-power mode. If, however, the test conducted in step 1114 indicates that the LPM signal has transitioned from high to low, the system performs a power up sequence in step 1116 and processing returns to step 1102 wherein the system operates in a normal mode of operation.

Figure 12:
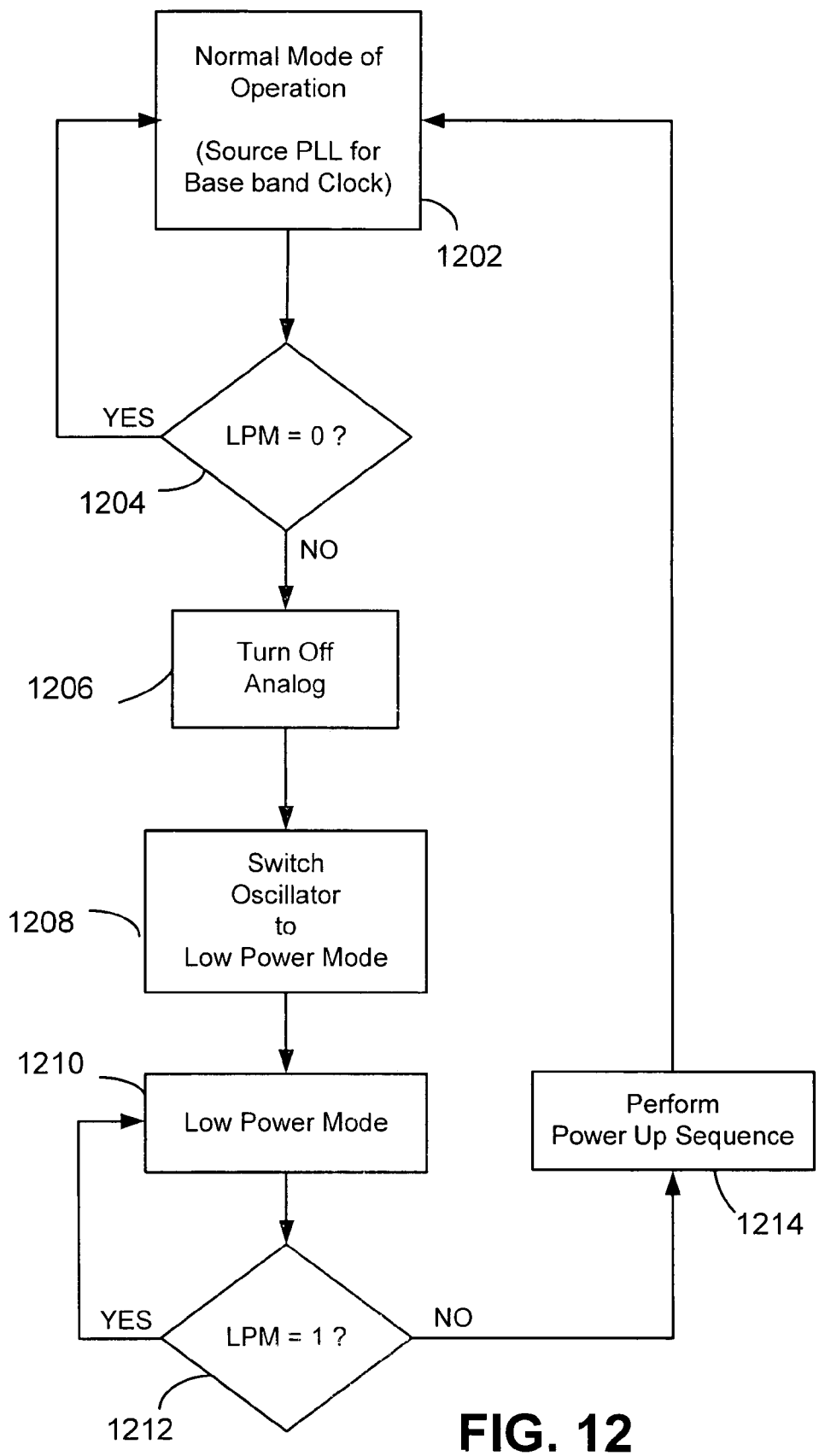
FIG. 12 is a flow chart illustrating the processing steps for operating the embodiment of wireless interface unit shown in FIG. 5B using the dual mode clock of the present invention.

Operation of the alternate embodiment of the dual mode clock illustrated in FIG. 5B can be understood from the processing steps illustrated in the flowchart of FIG. 12. In step 1202, the system enters the normal mode of operation wherein the oscillator 510 provides a clock signal directly to the baseband digital core 506 and to the frequency synthesizer 512 in the RF analog module 503 as discussed hereinabove. In step 1204, the status of the low-power mode signal LPM, is inspected by the power management unit 408. If the low-power mode signal is low, processing returns to step 1202 wherein the normal mode of operation is continued. If, however, the test in step 1204 indicates that the LPM signal is high, processing proceeds to step 1206 where the transceiver 504 in the RF analog module 503 is turned off. In step 1208 the oscillator is switched to low-power mode and processing proceeds to step 1210 where the system is operating in low-power mode. In step 1212, a test is conducted to determine whether the state of the LPM signal has changed. If the test conducted in step 1212 indicates that the LPM signal remains high, processing returns to step 1210 and the system continues to operate in the low-power mode. If, however, the test conducted in step 1212 indicates that the low-power mode signal has transitioned from high to low, the system performs a power up sequence in step 1214 and processing returns to step 1202 wherein the system operates in a normal mode of operation.

Figure 13:
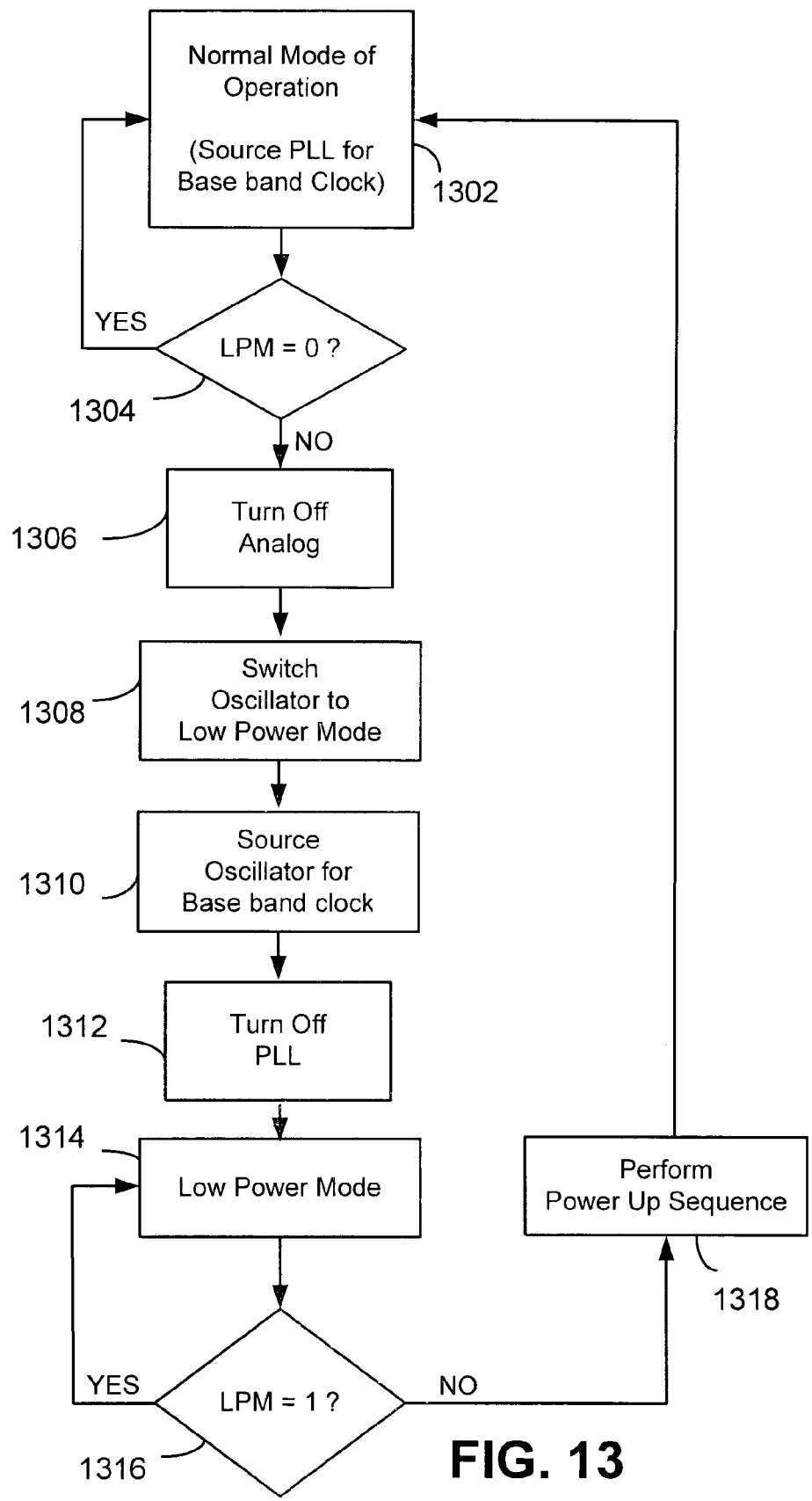
FIG. 13 is a flow chart illustrating the processing steps for operating the embodiment of wireless interface unit shown in FIG. 5C using the dual mode clock of the present invention.

Operation of the alternate embodiment of the dual mode clock illustrated in FIG. 5C can be understood from the processing steps illustrated in the flowchart of FIG. 13. In step 1302, the system enters the normal mode of operation wherein the oscillator 510 provides a clock signal directly to the baseband digital core 506 and to the frequency synthesizer 512 in the RF analog module 503 as discussed hereinabove. In step 1304, the status of the low-power mode, LPM, is inspected by the power management unit 408. If the LPM signal is low, processing returns to step 1302 wherein the normal mode of operation is continued. If, however, the test in step 1304 indicates that the LPM signal is high, processing proceeds to step 1306 where the transceiver 504 in the RF analog module 503 is turned off. In step 1308 the oscillator is switched to low-power mode and processing proceeds to step 1310 where the oscillator operates as the source for the baseband clock. The frequency synthesizer 512 is turned off in step 1312 and processing proceeds to step 1314 where the system is operating in low-power mode. In step 1316, a test is conducted to determine whether the state of the LPM signal has changed. If the test conducted in step 1316 indicates that the LPM signal remains high, processing returns to step 1314 and the system continues to operate in the low-power mode. If, however, the test conducted in step 1316 indicates that the low-power mode signal has transitioned from high to low, the system performs a power up sequence in step 1318 and processing returns to step 1302 wherein the system operates in a normal mode of operation.

Figure 5D:
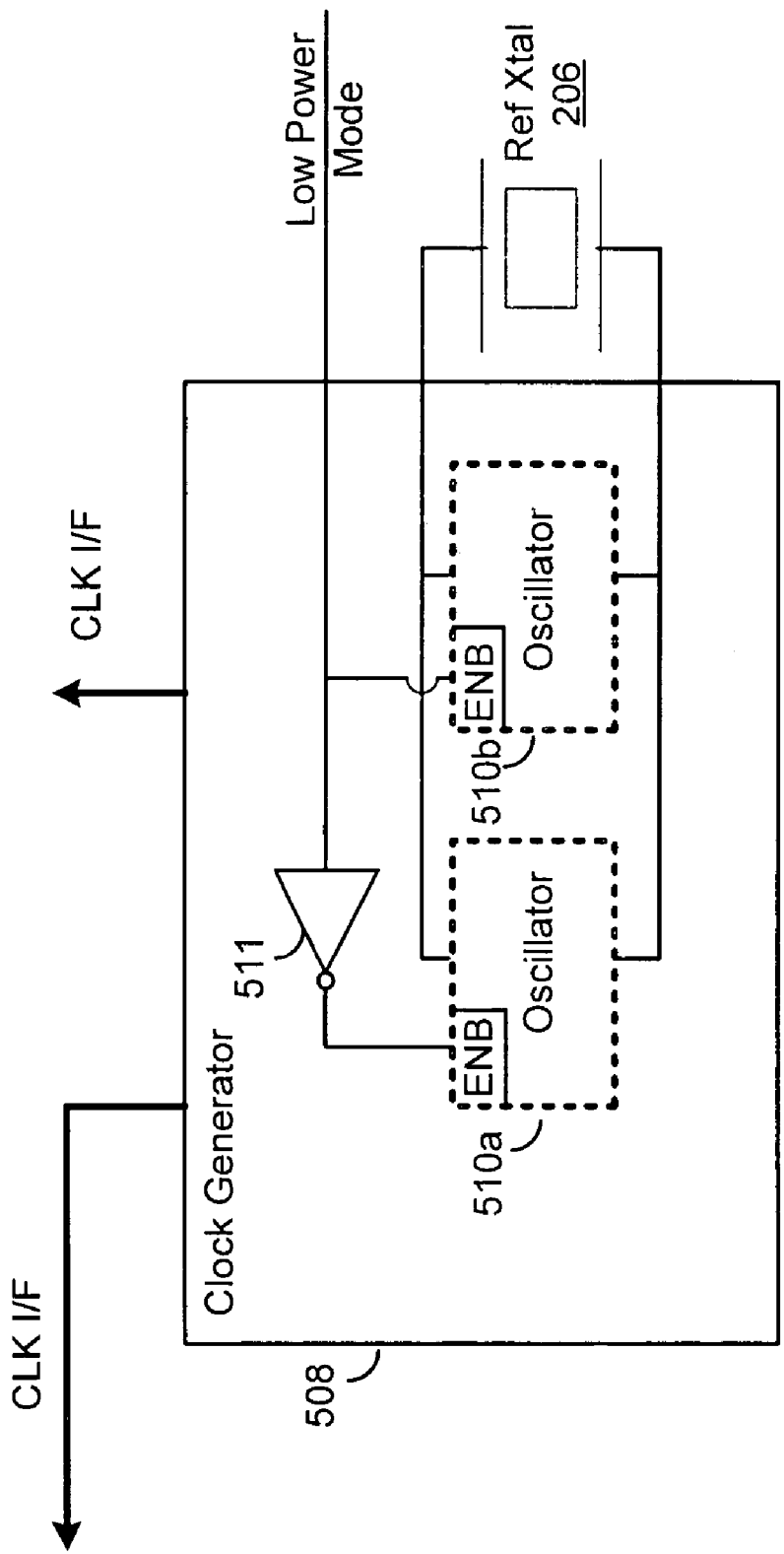

In the embodiments shown in FIGS. 5A, 5B, and 5C, described hereinabove, the clock generator is switched between normal mode and low-power mode by varying the power bias delivered to the oscillator circuit. A further alternate embodiment of the clock generator 508 shown in FIGS. 5A, 5B, and 5C, is shown in FIG. 5D. This embodiment employs two oscillator elements, 510A and 510B, which are enabled mutually exclusively. Oscillator 510A is designed such that it outputs a high-quality, low phase-noise clock signal, and operates at a higher power level than oscillator 510B. Oscillator 510B is designed to operate at a lower power level than oscillator 510A, while outputting a lower quality, higher phase-noise clock signal. The enable input, ENB, of oscillator 510B is driven directly by the low-power mode signal, LPM. The enable input of oscillator 510A is driven by digital inverter 511 which is in turn driven by the LPM signal. Both oscillator 510A and oscillator 510B are designed such that, when the ENB signal is driven low, the oscillator becomes inert, and does not significantly affect the operation of the other oscillator.

When the system is operating in normal mode, and the processing unit 402 drives LPM low, oscillator 510A is enabled while oscillator 510B is disabled. In this mode, oscillator 510A outputs a high quality, low phase-noise clock signal while operating at a higher power level.

When the system is operating in low-power mode, and the processing unit 402 drives LPM high, oscillator 510B is enabled while oscillator 510A is disabled. In this mode, oscillator 510B outputs a lower quality, higher phase noise clock signal while operating at a low power level.

One skilled in the art will recognize that the alternate clock generator embodiment shown in FIG. 5D and described hereinabove can be applied to each of the system architectures shown in FIGS. 5A, 5B, and 5C.

The invention disclosed herein is susceptible to various modifications and alternative forms. Specific embodiments, therefore, have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A system for managing power in a wireless interface system that services communications between a wirelessly enabled host and at least one user input device, comprising:

a wireless interface unit that wirelessly interfaces with the wirelessly enabled host, wherein the wireless interface unit comprises:

an analog module including a transceiver unit, a baseband core digital module further comprising:

a transceiver operation detector operable to detect operation of the transceiver unit, and a voltage regulator control signal generator operable to generate a voltage regulator reference control signal corresponding to the operational status of the transceiver;

a clock generator operable to generate first and second clock signals corresponding to a first operating state wherein the transceiver is operational and a second operating state wherein the transceiver is turned off;

a processing unit operably coupled to the wireless interface unit, said processing unit operable to use said reference control signal to generate a low power mode signal; and a power management unit operably coupled to the wireless interface unit, the processing unit, and the clock generator, wherein the power management unit is operable to receive said low power mode signal and to control the power consumption of the wireless interface unit by providing a first power level to the clock generator when low power mode signal is in a first state and providing a second power level to the clock generator when the low power mode signal is in a second state.

2. The wireless interface device of claim 1, wherein the wireless interface device enters one of a plurality of power consumption operating states comprising:

busy mode in which all components of the wireless interface device are powered and operational;

idle mode in which the wireless interface unit performs first power conserving operations;

suspend mode in which the wireless interface unit performs second power conserving operations; and power down mode in which the wireless interface unit and the processing unit are powered down.

3. The wireless interface device of claim 2, wherein in the idle mode the wireless interface unit periodically communicates with the wirelessly enabled host.

4. The wireless interface device of claim 2 wherein in the suspend mode:

the wireless interface unit does not transmit to the wirelessly enabled host; and the wireless interface unit listens to the transmissions of the wirelessly enabled host.

5. The wireless interface device of claim 4, wherein the power management unit powers down the wireless interface unit and the processing unit after at least one inactivity period during which the at least one user input device is inactive with respect to the input/output unit.

6. The wireless interface device of claim 1, wherein the user input device includes a cursor control device.

7. The wireless interface device of claim 1, wherein the user input device includes a keypad.

8. The wireless interface device of claim 1, wherein the user input device includes:

a cursor control device; and a keypad.

\* \* \* \* \*